Aug. 21, 1934.　　　　R. T. SMITH　　　　1,970,984
SPRAYING MACHINE
Original Filed Nov. 27, 1929　　3 Sheets-Sheet 1
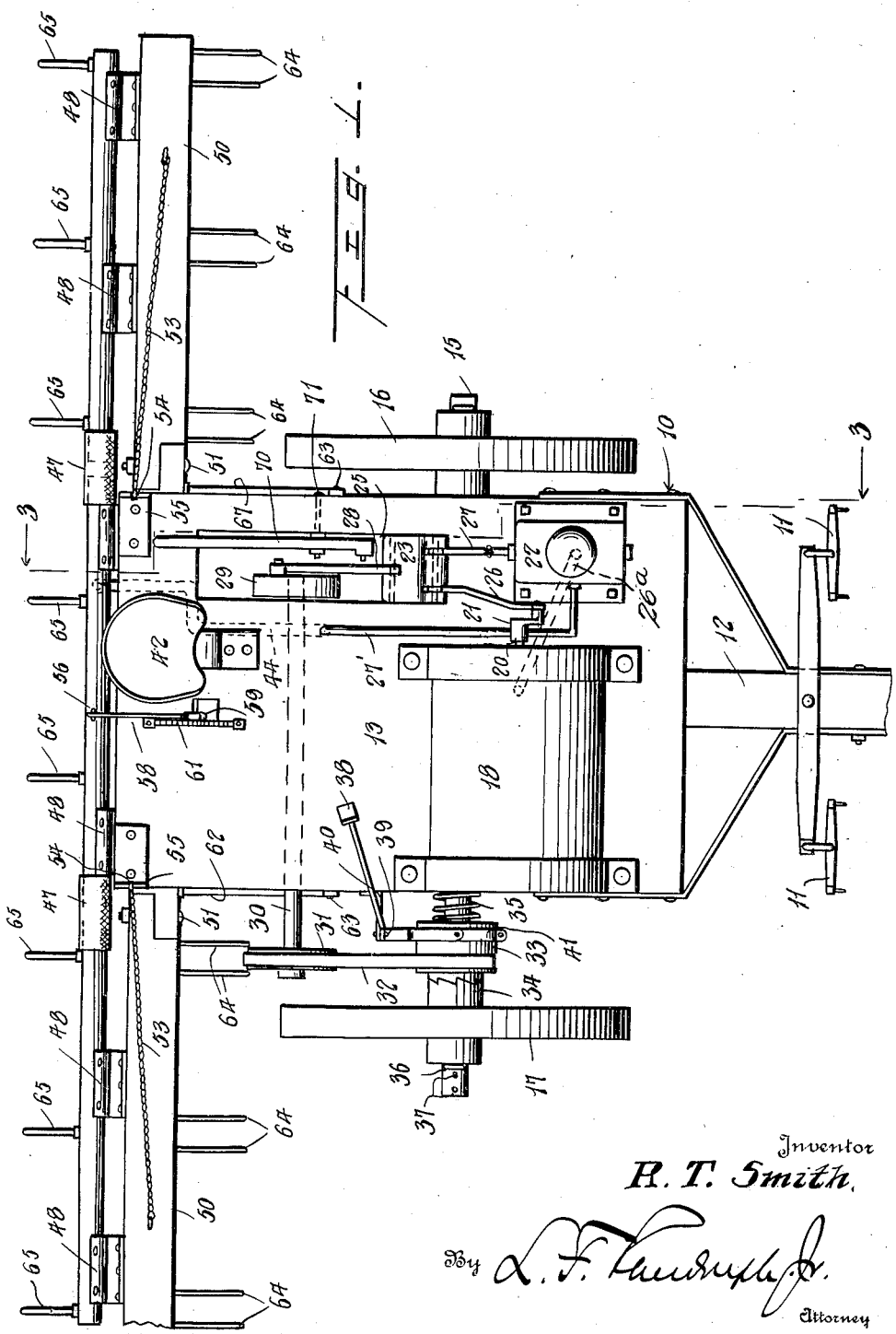
Inventor
R. T. Smith,
By L. F. [signature]
Attorney

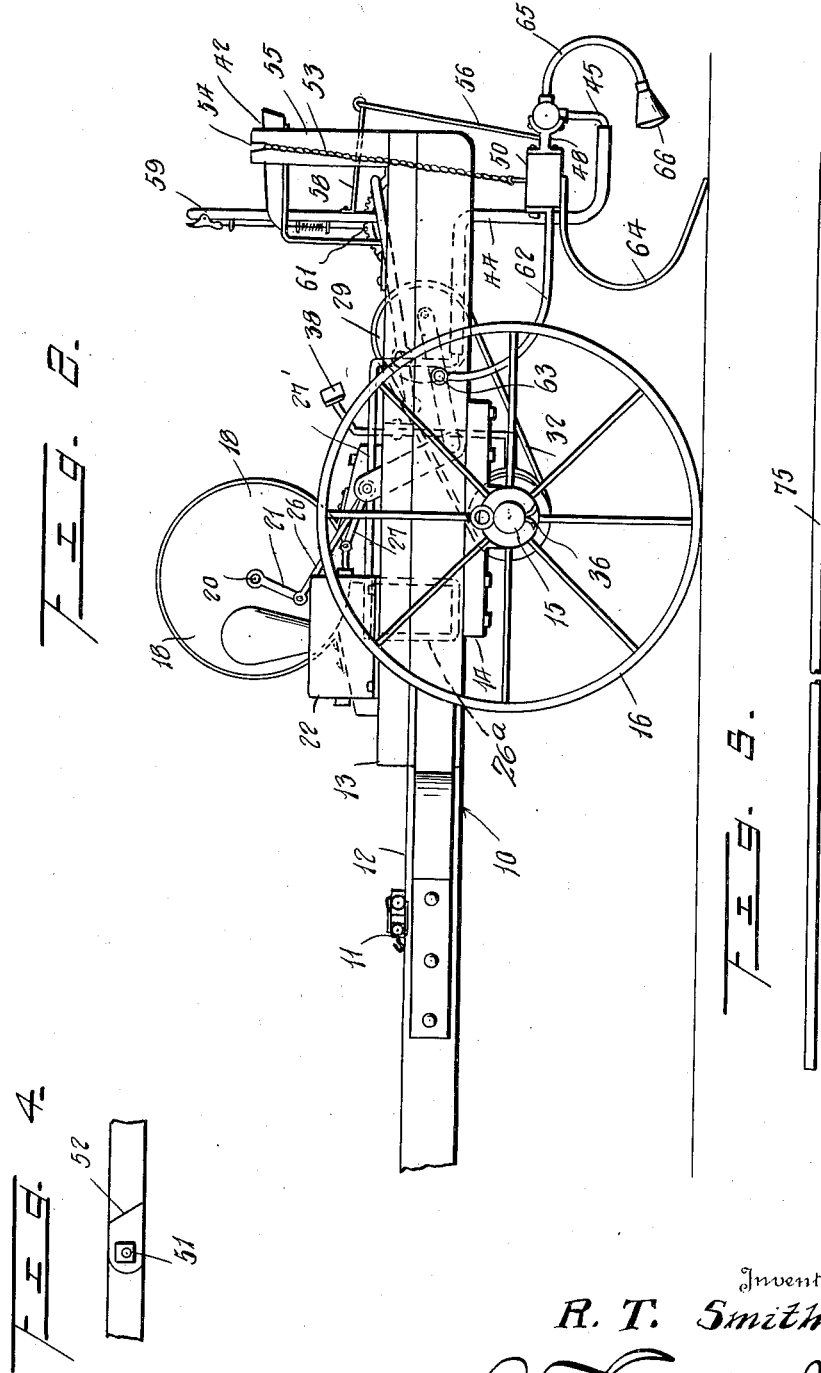

Aug. 21, 1934.  R. T. SMITH  1,970,984
SPRAYING MACHINE
Original Filed Nov. 27, 1929   3 Sheets-Sheet 3
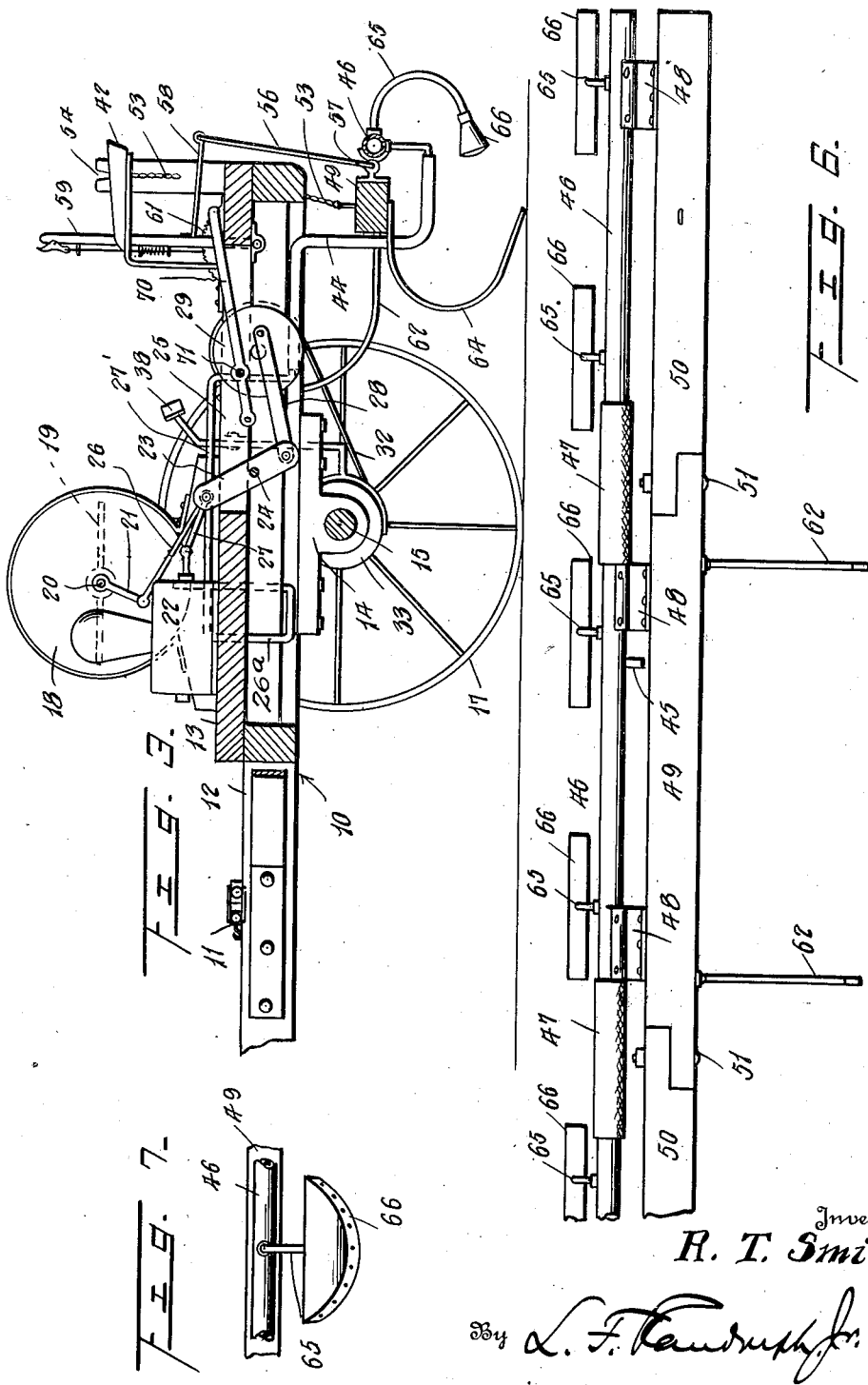

Patented Aug. 21, 1934

1,970,984

UNITED STATES PATENT OFFICE 1,970,984

SPRAYING MACHINE

Robert T. Smith, Eufaula, Okla., assignor of forty-five one-hundredths to Fred D. Smith, Wichita, Kans.

Application November 27, 1929, Serial No. 410,109
Renewed May 25, 1933

3 Claims. (Cl. 299—39)

This invention relates to a machine for spraying poison solutions on vegetation and for instance on cotton, potatoes and the like and aims to provide a novel machine which is adjustable so that it may operate upon a single row or a plurality of rows for instance eight rows, and may also be used as a broadcast sprayer and for spraying in orchards.

A particular object of the invention is to provide a construction wherein the poisonous solution is sprayed onto the under side of the plant leaves instead of on top as is the current practice, so as to more effectively reach the insects sought to be exterminated.

Another object is to provide a construction wherein power is derived from travel of a vehicle and also a construction which may be hand or manually operated when desired and when the vehicle is not traveling.

Another object is to provide a novel construction having means whereby the vegetation or foliage is depressed as the vehicle travels with respect thereto in order that the spray may more effectively reach the under side of the leaves.

Still another object is to provide a novel construction wherein the machine is adjustable as to width according to the particular row being worked.

Additional objects and advantages will become apparent from a consideration of the description following taken in connection with accompanying drawings illustrating an operative embodiment and wherein:

Figure 1 is a plan view of the spraying machine,

Figure 2 is a right hand side elevation thereof,

Figure 3 is a longitudinal sectional view taken on the line 3—3 of Figure 1,

Figure 4 is a detail elevation of the joints between sections of the beams mounting the sprayers, Figure 5 is a detail elevation of the spray hose as used in orchards or the like, Figure 6 is a plan view of the spraying pipe and nozzles, and Figure 7 is a detail elevation of one of the spraying nozzles.

Referring specifically to the drawings, 10 generally designates a vehicle adapted to be drawn by animal power hitched to trees 11 carried by a tongue or draft pole 12. Said tongue or draft pole 12 extends from a body or platform 13 which has bearings 14 rigidly mounting an axle 15 on which ground wheels 16 and 17 are journaled.

Suitably fastened on the platform or body 13 is a tank or container 18 for the poisonous or insect-killing solution adapted to be sprayed on vegetation. Within the tank 18 is an agitator 19 carried by a shaft 20 having a crank 21 thereon exteriorly of the tank. Also mounted on the body 13 is a pump 22. The pump 22 and the agitator 19 are adapted to be operated through the motion of the wheels 17 as the machine moves over a field. To this end, a crank lever 23 is journaled at 24 on platform 13, operating in a slot or open space 25 thereof. At the upper end, lever 23 has a link 26 pivoted thereof and also pivoted to the crank 21. In addition a link or pitman 27 is pivoted to the crank 23 and to the piston of the pump 22. As a result, the operation of crank 23 operates both the agitator 19 and the pump 22. It is obvious that the pump may be of any desired or conventional construction and that it is adapted to remove solution from the tank through a pipe line 26ª through the pump and thence forwardly through a pipe line 27'. In order to operate the crank 23, a pitman 28 is pivoted thereto and eccentrically pivoted to a disk 29 which is keyed to a shaft 30 journaled on the under structure of the platform 13. Said shaft 30 has a pulley 31 thereon over which a belt 32 is trained which also is trained over a clutch block 33 normally held in engagement with a clutch head 34 on the hub of wheel 17 and urged into such engagement by an expansive spring 35 surrounding the axle 15 and abutting the clutch section 33 and platform 13. The wheel 17 is adjustable longitudinally along the shaft 15 according to the width of the row traversed, its position being governed by the application of a cotter or the equivalent 36 in a selected series of openings 37 in the axle. Clutch 33 is adapted to be shifted by the foot of the operator engaging a pedal 38 in the form of a lever pivoted at 39 to a bracket 40 on the platform and in articulate relation with a ring or the like 41 disposed in an annular groove of the clutch block 33. The operator's seat is suggested at 42 and located on the platform 13 at the rear thereof.

The pipe line 27' by means of detachable rubber hose or other flexible connections as at 44 communicates with a nipple 45 on a distributing pipe or header 46 which as shown may consist of a plurality of such sections 46 connected together by removable flexible hose at 47. The pipe 46 by means of brackets 48, is fastened to supporting beams 49 and 50, the latter beams 50 being pivoted as at 51 to the beams 49 but held against movement below horizontal alinement therewith in view of the engagement of inclined surfaces 52 on such beams with each other.

Beams 50 have suspending chains 53 fastened thereto which are engageable at links thereof with notches 54 in uprights 55 on the platform. Such sections 50 may be raised, with the sections 46 correspondingly moving and yielding at the pipe 47, by upward movement of the chains 53 and subsequent release thereof in the notches 54 in such manner that they will be held in the raised or adjusted position.

In order to raise the beams 49 and hence the beams 49 and 50 as a whole, a link 56 is pivoted to a bracket 57 on the beam 49 and then to a crank 58 extending from a lever 59. Lever 59 is located adjacent the operator's seat and is adapted for manual operation so as to raise and lower the beams 49 and 50, the lever operating in connection with a conventional lock and segment mechanism as at 61.

Beam 49 by means of arms 62 is pivoted at 63 to the platform and pressing members consisting of pairs of spaced arms 64 are fastened to the under surface of the beam 49 and its sections 50, serving to depress vegetation as the machine advances in order to expose the under surfaces of the leaves. Leading from manifold 46 are any suitable number of pipes 65 having outlet nozzles 66 thereon to direct the spray to the under surfaces of the leaves or vegetation depressed by the elements 64. The nozzles 66 may be of the shape detailed in Figure 7.

The construction described provides a sprayer which may be used for spraying eight rows of cotton plants or the like at a single drive over the field. In cases where such width is not to be sprayed, sections 50 and outer pipes 46 may be omitted altogether with the remaining beam 49 carrying a single pipe 46, whose ends are appropriately closed.

Also in the latter instance, the sprayer is adapted for use while stationary as in the spraying of orchards or the like, in which event, manual operation of the pump 22 and agitator 19 is resorted to. To this end, the crank 28 is detached from the disk 29 and in its stead, a lever 70 pivoted at 71 to the platform 13 is pivoted to the crank 28. Reciprocation of the lever 70 will result in the same action and flow of fluid as rotation of the disk 29. The pipe or hose 75 is used in such event, being appropriately connected in the line 27, in such manner, that the fluid does not pass through the pipes 46 and nozzles thereon.

Various changes may be resorted to provided they fall within the spirit and scope of the invention.

I claim as my invention:—

1. A spraying machine of the class described having a vertically adjustable beam, a manifold supported thereon, beams pivoted at the ends of the first mentioned beam and having end engagement therewith along an inclined surface to limit downward movement thereof to the horizontal and to cause elevation of all beams in parallelism to the ground, a manifold carried by each of the end beams and flexibly connected to the first manifold, uprights on the machine having notches, flexible elements suspending the end beams and engageable with the notches to secure the beams in adjusted position.

2. A spraying machine of the class described having a mobile body, a beam below the body, means pivotally connecting the beam to the body, means connected to the body and beam operable to vertically adjust the beam, elements extending from the beam to depress vegetation to expose the under surface thereof, and spraying means including nozzles directed to discharge adjacent the free ends of said members.

3. A spraying machine of the class described having a mobile body, a beam below the body, means pivotally connecting the beam to the body, means connected to the body and beam operable to vertically adjust the beam, elements extending from the beam to depress vegetation to expose the under surface thereof, spraying means including nozzles directed to discharge adjacent the free ends of said members, beams pivoted to the ends of the first mentioned beam and having engagement therewith along inclined planes to prevent lowering thereof below the horizontal, and to cause the end beams to move vertically with the first mentioned beam when the latter is adjusted, leaf depressing elements carried by the second mentioned beams, nozzles carried by the second mentioned beams and directed to discharge adjacent the free ends of the last mentioned members, manifolds on each beam to which the nozzles are connected, and flexible connections between the manifolds, uprights on the body and flexible elements connected to the second mentioned beams and attachable to the uprights.

ROBERT T. SMITH.